US 9,705,968 B2

United States Patent
Inomata (10) Patent No.: US 9,705,968 B2
(45) Date of Patent: Jul. 11, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD, Minato-ku, Tokyo (JP)

(72) Inventor: Kohshiro Inomata, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 211 days.

(21) Appl. No.: 14/285,895

(22) Filed: May 23, 2014

(65) Prior Publication Data
US 2015/0052183 A1 Feb. 19, 2015

(30) Foreign Application Priority Data

Aug. 15, 2013 (JP) ................. 2013-168967

(51) Int. Cl.
*H04L 29/08* (2006.01)

(52) U.S. Cl.
CPC .............. *H04L 67/10* (2013.01); *H04L 67/02* (2013.01)

(58) Field of Classification Search
CPC .................. H04L 67/10; H04L 67/02
See application file for complete search history.

(56) References Cited

U.S. PATENT DOCUMENTS

| 8,544,085 B2* | 9/2013 | Fusaka ............... H04N 1/00838 713/156 |
| 8,913,274 B2* | 12/2014 | Watanabe ......... G06F 17/30899 358/1.15 |
| 8,958,083 B2* | 2/2015 | Shozaki ............... G05B 19/409 358/1.13 |
| 9,015,498 B2* | 4/2015 | Fukushima ........ H04N 1/00244 358/400 |
| 2008/0192287 A1* | 8/2008 | Iwai ..................... H04N 1/4433 358/1.15 |

FOREIGN PATENT DOCUMENTS

| JP | 2003-141002 A | 5/2003 |
| JP | 2008-199180 A | 8/2008 |

* cited by examiner

*Primary Examiner* — Jerry Dennison
(74) *Attorney, Agent, or Firm* — Sughrue Mion, PLLC (57) ABSTRACT

An information processing apparatus includes a transmission unit, a notification unit, and an instruction unit. The transmission unit transmits a request for processing to a destination at which the request is accepted. The notification unit makes a notification of destination information including first information used to call the information processing apparatus and second information concerning the requested processing. The instruction unit instructs an external apparatus, when the external apparatus calls the information processing apparatus using the destination information, to perform an operation concerning the requested processing on the basis of the second information.

15 Claims, 8 Drawing Sheets

FIG. 11 https:···com/a01/&j=J001&t1=1h&t2=30m

FIRST ELAPSED TIME
SECOND ELAPSED TIME

FIG. 12

FIG. 13 https:··u=www.abc.com/a01/&j=J001&number=1

HOST NAME, ETC. OF ACQUISITION DESTINATION a
ORDER NUMBER https:··u=www.efg.com/a01/&j=J001&number=2

HOST NAME, ETC. OF ACQUISITION DESTINATION b
ORDER NUMBER https:··u=www.hij.com/a01/&j=J001&number=3

HOST NAME, ETC. OF ACQUISITION DESTINATION c
ORDER NUMBER

| OPERATION CONCERNING REQUESTED PROCESSING | USER ID HAVING AUTHORITY | | | |
|---|---|---|---|---|
| ACQUISITION OF STATUS OF REQUESTED PROCESSING | ID001 | ID002 | ID004 | ... |
| ACQUISITION OF RESULT DATA | ID002 | ID004 | ID005 | ... |
| OUTPUT OF RESULT DATA | ID018 | ID023 | ID029 | ... |
| ... | ... | ... | ... | ... |

FIG. 16

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-168967 filed Aug. 15, 2013.

BACKGROUND

Technical Field

The present invention relates to an information processing apparatus, an information processing method, and a non-transitory computer readable medium.

SUMMARY

According to an aspect of the invention, there is provided an information processing apparatus including a transmission unit, a notification unit, and an instruction unit. The transmission unit transmits a request for processing to a destination at which the request is accepted. The notification unit makes a notification of destination information including first information used to call the information processing apparatus and second information concerning the requested processing. The instruction unit instructs an external apparatus, when the external apparatus calls the information processing apparatus using the destination information, to perform an operation concerning the requested processing on the basis of the second information.

BRIEF DESCRIPTION OF THE DRAWINGS

Exemplary embodiments of the present invention will be described in detail based on the following figures, wherein.

DETAILED DESCRIPTION

[1] Exemplary Embodiments

[1-1] Entire Configuration

Figure 1:
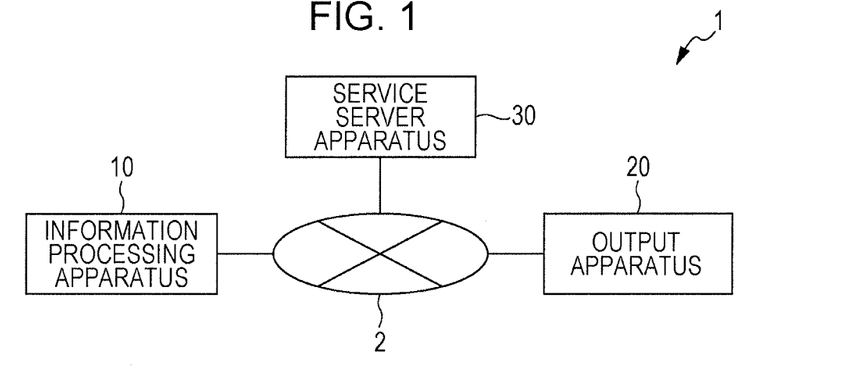
FIG. 1 illustrates an example of the entire configuration of an information processing system of an exemplary embodiment of the invention.

FIG. 1 illustrates an example of the entire configuration of an information processing system of an exemplary embodiment of the invention. Referring to FIG. 1, an information processing system 1 includes an information processing apparatus 10, an output apparatus 20, a service server apparatus 30, and a network 2 to which the information processing apparatus 10, the output apparatus 20, and the service server apparatus 30 are connected. The network 2 is a system that performs communication with, for example, the Internet or a mobile communication network included. The network 2 mediates exchange of data between the apparatuses connected to the information processing system.

The service server apparatus 30 provides a process execution service in which a process specified by a user (hereinafter referred to as a "specified process") is executed. The service server apparatus 30 executes, for example, a process to convert an image, a process to translate a sentence, and a process to convert the format of data as the specified process. The service server apparatus 30 is used by the user who has been registered for use of the process execution service. Specifically, the service server apparatus 30 stores a user identifier (ID) and a password for identifying the user and exchanges data with an apparatus in which the user has logged using the user ID and the password to provide the process execution service. The specified process may be executed by a mechanism that provides the process execution service causing the user to use computer resources in a cloud computing mode.

Upon transmission of request data indicating a request for the specified process to a destination at which the request for the specified process is accepted (such a destination is hereinafter referred to as a "request destination"), the service server apparatus 30 executes the specified process on the basis of the request indicated by the request data. In addition, the service server apparatus 30 transmits result data indicating the result of the execution of the specified process to an apparatus that accesses a destination to which the result of the specified process is supplied, that is, a destination from which the result of the specified process is acquired from the viewpoint of the user (such a destination is hereinafter referred to as an "acquisition destination"). The request destination and the acquisition destination are each indicated by, for example, a Uniform Resource Locator (URL).

The information processing apparatus 10 is operated by a user and requests the service server apparatus 30 to execute the specified process on the basis of the content of the operation by the user. In addition, the information processing apparatus 10 manages the status of the specified process which the service server apparatus 30 is requested to execute. How to manage the status of the specified process will be described in detail below.

The output apparatus 20 is operated by a user and acquires the result data from the service server apparatus 30 to output the result data. The output apparatus 20 has a function to form an image in the present exemplary embodiment and outputs a result indicated by the result data on a medium, such as a sheet of paper, to provide the result of the specified process to the user. The user who receives the result of the specified process may be the user who has performed the operation to request the specified process or may be another user. The output destination of the result data is not limited to the medium and may be a display unit, such as a display, or a terminal, such as a smartphone, carried by the user.

[1-2] Hardware Configuration

Figure 2:
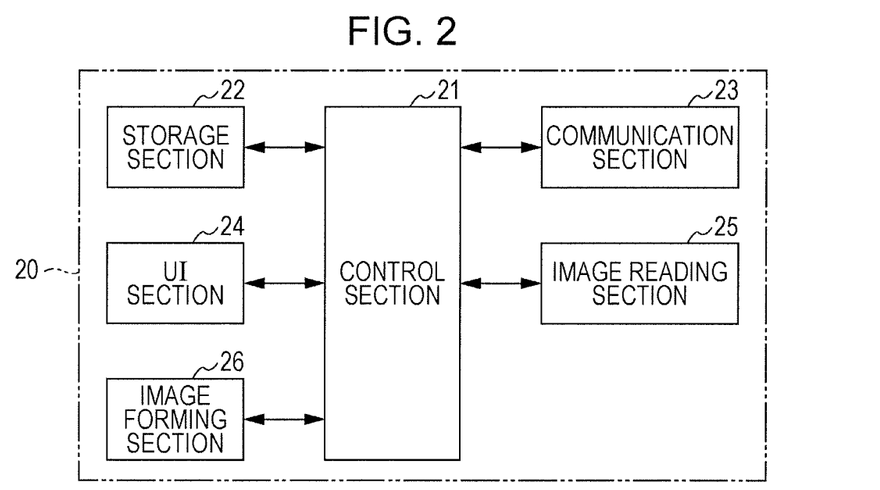
FIG. 2 is a block diagram illustrating an example of the hardware configuration of an output apparatus.

FIG. 2 is a block diagram illustrating an example of the hardware configuration of the output apparatus 20. Referring to FIG. 2, the output apparatus 20 is a computer including a control section 21, a storage section 22, a communication section 23, a user interface (UI) section 24, an image reading section 25, and an image forming section 26. The control section 21 includes a central processing unit (CPU), a read only memory (ROM), a random access memory (RAM), and a real-time clock. The CPU executes a program stored in the ROM or the storage section 22 using the RAM as a working area to control the operation of each component. The real-time clock calculates the current date and time to notify the CPU of the current date and time. The storage section 22 includes, for example, a hard disk and stores data and programs used for the control by the control section 21.

The communication section 23 includes a communication circuit for communication and transmits and receives data to and from the output apparatus 20 and the service server apparatus 30 via the network 2. The UI section 24 includes a display screen and a touch panel superimposed on the display screen. The UI section 24 accepts an operation by the user and displays an image. The UI section 24 supplies operation data corresponding to the accepted operation by the user to the control section 21, which performs processing corresponding to the operation data. The image reading section 25 is, for example, a scanner and optically reads an image of content, which is formed on a medium, such as a sheet of paper, to supply image data representing the image that is read to the control section 21. The image forming section 26 forms an image on a medium, such as a sheet of paper. For example, the image forming section 26 electrophotographically forms the image on the sheet of paper using toner of four colors: yellow (Y), magenta (M), cyan (C), and black (K).

Figure 3:
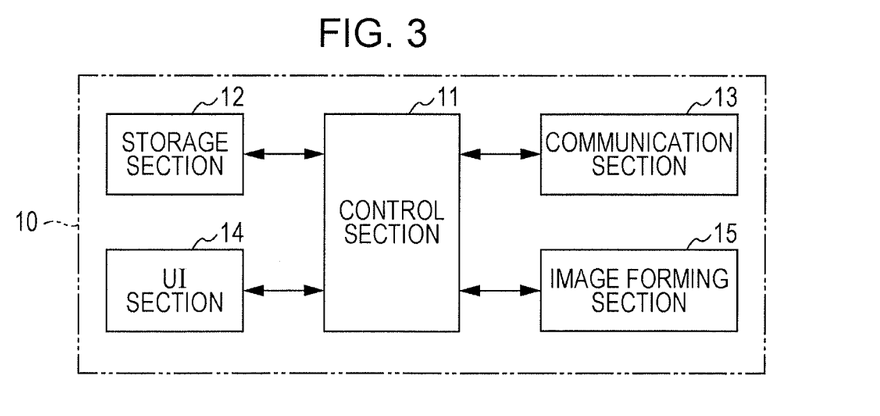
FIG. 3 is a block diagram illustrating an example of the hardware configuration of an information processing apparatus.

FIG. 3 is a block diagram illustrating an example of the hardware configuration of the information processing apparatus 10. Referring to FIG. 3, the information processing apparatus 10 is a computer including a control section 11, a storage section 12, a communication section 13, a UI section 14, and an image forming section 15. Each of these components is hardware having a function common to that of the component with the same name in the output apparatus 20 (however, these components may have different performances). The storage section 12 stores a processing program to request the service server apparatus 30 to execute a process and to manage the status of the process.

[1-3] Functional Configuration

The information processing apparatus 10 executes a management process to manage the status of the process which the information processing apparatus 10 has requested the service server apparatus 30 to execute on the basis of the hardware configuration described above. The control section 11 executes the processing program stored in the storage section 12 to control the components, thereby realizing the functions described below.

Figure 4:
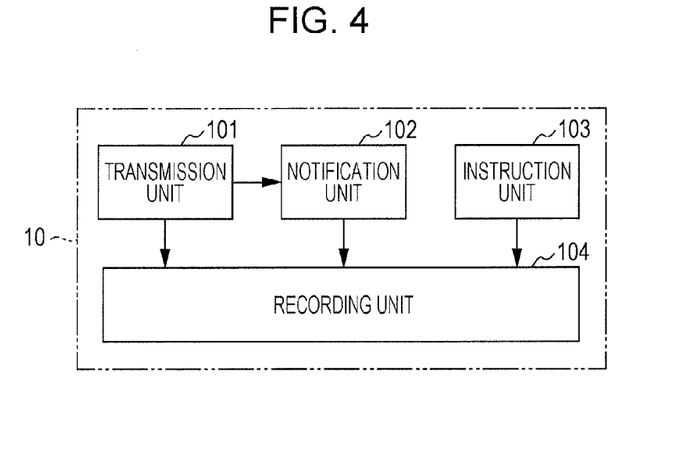
FIG. 4 is a block diagram illustrating an example of the functional configuration of the information processing apparatus.

FIG. 4 is a block diagram illustrating an example of the functional configuration of the information processing apparatus 10. Referring to FIG. 4, the information processing apparatus 10 includes a transmission unit 101, a notification unit 102, an instruction unit 103, and a recording unit 104.

[1-3-1] Transmission Unit 101

The transmission unit 101 is an exemplary unit to transmit the request data indicating the request to the request destination described above (the destination at which the request for the process is accepted). The service server apparatus 30 provides a menu site in which operation items performed by the user using the process execution service are indicated. The information processing apparatus 10 has a browser function and accesses the menu site in response to an operation by the user. Upon input of the user ID and the password by the user to log in the service server apparatus 30, the menu site is displayed in the UI section 14.

Figure 5:
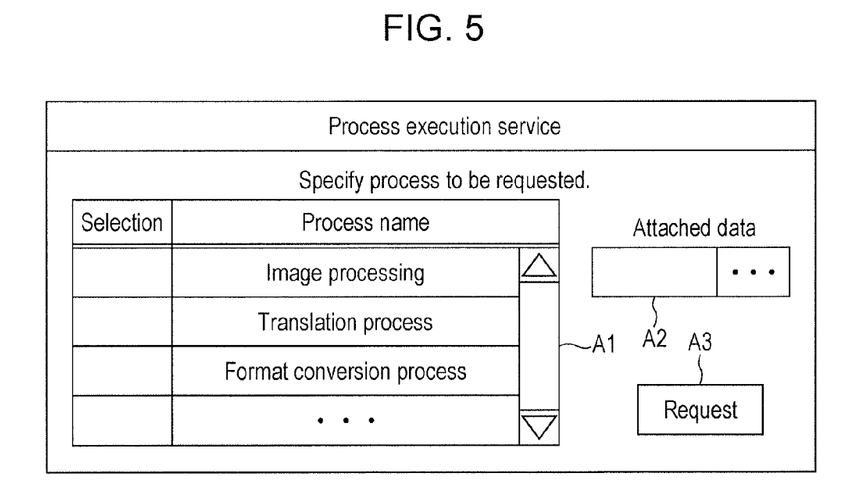
FIG. 5 illustrates an exemplary menu site.

FIG. 5 illustrates an example of the menu site. An operation image A1 used to specify a process to be requested, an operation image A2 used to attach data when it is necessary to pass the data to the service server apparatus 30, and an operation image A3 that is operated to determine the content of the request are displayed in the menu site in FIG. 5. Upon tapping (softly pressing) the operation image A3 by the user, the information processing apparatus 10 is notified of the request destination from the service server apparatus 30. When the request destination is set in advance and the request destination is stored in the information processing apparatus 10, this notification may not be performed.

Upon operation of the operation image A1 to specify a process to be requested, operation of the operation image A2 to attach data, if needed, and tapping of the operation image A3 by the user, the transmission unit 101 determines information for identifying the specified process represented by the above operations (such information is hereinafter referred to as "process identification information" and is also referred to as a job ID) and transmits the request data indicating the request for the specified process and the process identification information for identifying the specified process that is requested to the request destination notified from the service server apparatus 30. After the transmission of the request data, the transmission unit 101 also supplies the request data to the notification unit 102 and the recording unit 104.

The transmission unit 101 may not use the menu site illustrated in FIG. 5 and may transmit the request data using, for example, input information input by the user with the UI section 14. The input information is, for example, the URL indicating the request destination, the name of a folder in which the data to be passed to the service server apparatus 30 is stored, or the process identification information arbitrarily determined by the user. In this case, the transmission unit 101 supplies the input information to the recording unit 104. The method of inputting the input information is not limited to the above one. For example, if the information processing apparatus 10 includes an image reading section, the image reading section may be caused to read an image representing the input information. Alternatively, the input information may be supplied via a storage medium, such as a universal serial bus (USB) memory, or the network 2. The input information may be selected from multiple pieces of input information stored in the storage section 12 in the information processing apparatus 10 in advance.

[1-3-2] Notification Unit 102

The notification unit 102 is an exemplary unit to notify the user of destination information including a destination (as an example of first information) with which the information processing apparatus 10 is called (such a destination is hereinafter referred to as an "apparatus destination") and associated information (as an example of second information) concerning the specified process requested in the request data transmitted by the transmission unit 101 (such a specified process is hereinafter referred to as "requested processing"). In the present exemplary embodiment, the notification unit 102 notifies the user of the destination information including the acquisition destination described above in the requested processing (the destination from which the result of the specified process is acquired) and the process identification information (the information for identifying the requested processing) as the associated information. The associated information and the destination information will now be described with reference to FIG. 6 and FIG. 7.

Figure 6:
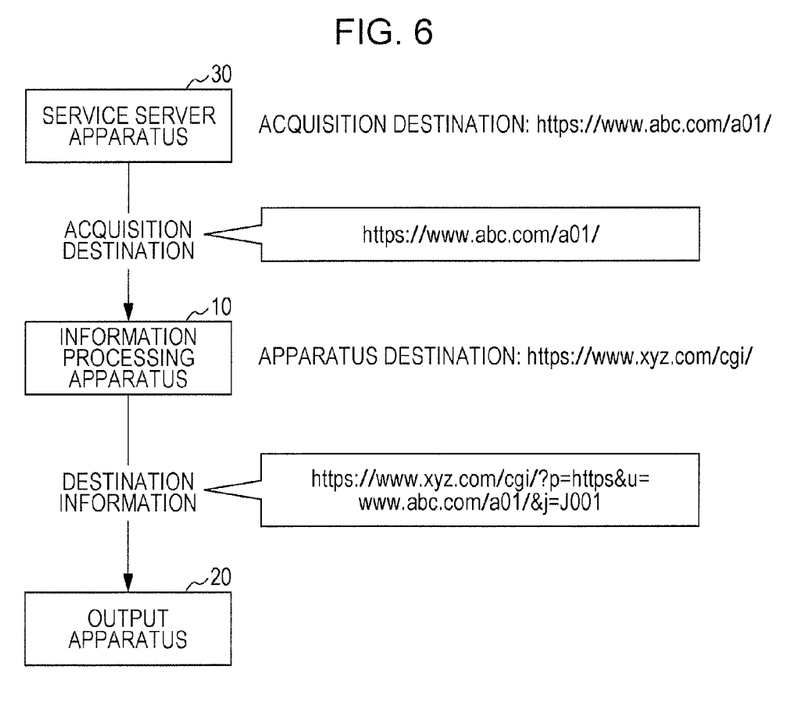
FIG. 6 is an exemplary diagram for describing notification of destination information.

FIG. 6 is an exemplary diagram for describing the notification of the destination information. Upon reception of the request data transmitted from the transmission unit 101, the service server apparatus 30 starts the execution of the requested processing and transmits the acquisition destination to the information processing apparatus 10. In the example in FIG. 6, the service server apparatus 30 transmits an URL "https://www.abc.com/a01/" as the acquisition destination. The transmitted acquisition destination is supplied to the notification unit 102. The request data is also supplied from the transmission unit 101 to the notification unit 102. As described above, the request data indicates the process identification information ("J001" in the example in FIG. 6). In the present exemplary embodiment, an URL "https://www.xyz.com/cgi/" is used as the apparatus destination. The notification unit 102 uses the apparatus destination, the acquisition destination, and the process identification information to generate the destination information in the following manner.

Figure 7:
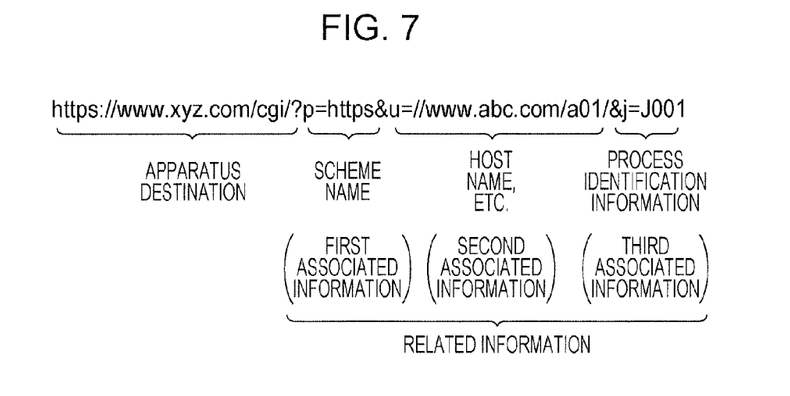
FIG. 7 illustrates an example of the destination information that is generated.

FIG. 7 illustrates an example of the destination information that is generated. In the example in FIG. 7, the notification unit 102 generates the destination information "https://www.xyz.com/cgi/?p=https&u=//www.abc.com/a01/&j=J001." In the destination information, "https://www.xyz.com/cgi/" indicates the apparatus destination. In the destination information, "p=https", "u=//www.abc.com/a01", and "j=J001" are first associated information, which indicates the scheme name of the URL, second associated information, which indicates the host name, etc., and third associated information, which indicates the process identification information described above, respectively. The first associated information, the second associated information, and the third associated information are collectively referred to as the associated information. In the destination information, "?" is a symbol for defining a parameter to be passed to the server when a file is acquired from a Web server with, for example, a GET method using the URL. In the information processing system 1, "?" is used as the symbol that separates the apparatus destination from the associated information. In the destination information, "&" is a symbol that separates the parameters and is used as the symbol that separates the first associated information from the second associated information and the symbol that separates the second associated information from the third associated information in the example in FIG. 7.

Upon generation of the destination information illustrated in FIG. 7, the notification unit 102 notifies the user of the generated destination information. For example, the notification unit 102 stores the user ID of the user, used in the service server apparatus 30, in association with an electronic mail address of the user. The notification unit 102 transmits an electronic mail in which the destination information is described or to which the destination information is attached to the electronic mail address stored in association with the user ID, which is input in the access to the menu site illustrated in FIG. 5. The user opens the electronic mail with a smartphone or a personal computer which the user carries to be notified of the destination information.

The address input as the input information described above may be used as the electronic mail address of the user. The notification unit 102 may notify the user of the destination information using another method. For example, the notification unit 102 may transmit the destination information to an account of Social Networking Service (SNS), may display the destination information with the UI section 14, or may form the destination information on a medium with the image forming section 15. When the destination information is displayed or is formed on a medium, the destination information may be represented by a barcode or a Quick Response (QR) code to be read out from the barcode or the QR code using the function of the smartphone or the like. Alternatively, the image on the medium may be read out with the image reading section 25 in the output apparatus 20 and the destination information may be read out from the code included in the image that is read out.

After the notification is performed in the above manner, the notification unit 102 supplies the destination information of which the user is notified to the recording unit 104.

[1-3-3] Instruction Unit 103

The instruction unit 103 is an exemplary unit to instruct an external apparatus that has called the information processing apparatus 10 using the destination information notified by the notification unit 102 to perform an operation concerning the requested processing described above on the basis of the associated information included in the destination information. The external apparatus in the present exemplary embodiment is the output apparatus 20.

[1-3-3-1] Access Instruction

The instruction unit 103 instructs the external apparatus (that is, the output apparatus 20) to access, for example, the acquisition destination included in the destination information. Information exchanged among the service server apparatus 30, the information processing apparatus 10, and the output apparatus 20 when the output apparatus 20 accesses the information processing apparatus 10, the instruction unit 103 instructs the output apparatus 20 to access the acquisition destination, and the output apparatus 20 accesses the acquisition destination in accordance with the instruction will now be descried with reference to FIG. 8.

Figure 8:
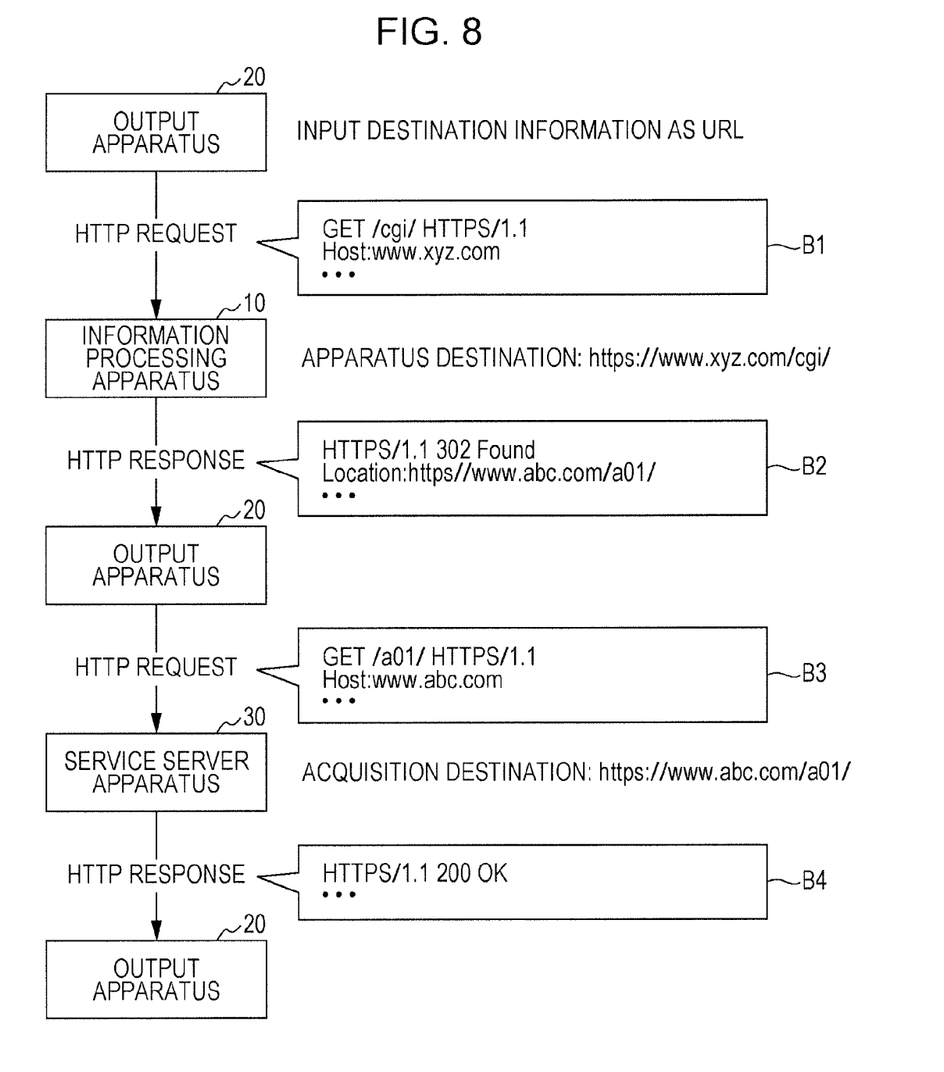
FIG. 8 illustrates an example of information exchanged before and after an instruction is issued by an instruction unit.

FIG. 8 illustrates an example of the information exchanged among the service server apparatus 30, the information processing apparatus 10, and the output apparatus 20 before and after the instruction is issued by the instruction unit 103. The output apparatus 20 has a browser function and, upon input of the destination information as a URL with an operation by the user, transmits a Hypertext Transfer Protocol (HTTP) request B1 to request transmission of a file of the apparatus destination indicated by the destination information using, for example, the GET method to the information processing apparatus 10. The HTTP request B1 that is received is supplied to the instruction unit 103. The instruction unit 103 uses the associated information indicated after "?" in the destination information included in the HTTP request B1 to generate the acquisition destination. Specifically, the instruction unit 103 combines "p=https", which is the first associated information, with "u=//www.abc.com/a01", which is the second associated information, to generate the acquisition destination "https://www.abc.com/a01."

The instruction unit 103 transmits an HTTP response B2 of HTTP status code 302 (Found) in which the generated acquisition destination is used as Location to the output apparatus 20. The output apparatus 20 transmits an HTTP request B3 to the URL (the acquisition destination in this case) included in a Location header of the received HTTP response B2 with the browser function using the GET method. The instruction unit 103 transmits the HTTP response B2 to the output apparatus 20 to instruct the output apparatus 20 to access the acquisition destination in the above manner. This instruction is to cause the apparatus that has called the information processing apparatus 10 to access another destination and is called transfer or redirect. After the instruction unit 103 issues the instruction in the above manner, the instruction unit 103 supplies the destination information included in the HTTP request B1 transmitted from the output apparatus 20 to the recording unit 104.

[1-3-3-2] Operation after Instruction

The operations of the output apparatus 20 and the service server apparatus 30 after the instruction is issued by the instruction unit 103 will now be described. Upon reception of the HTTP request B3, the service server apparatus 30 transmits an HTPP response B4 representing a status site indicating the status of the requested processing to the output apparatus 20.

Figure 9A:
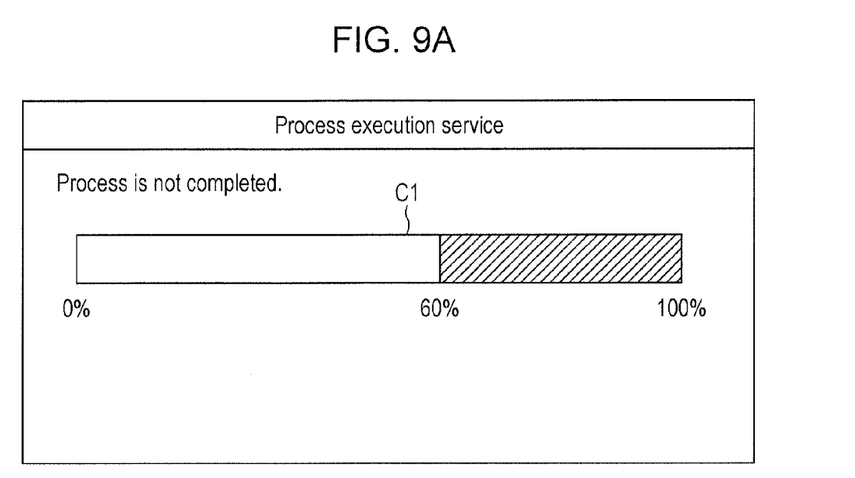
FIGS. 9A and 9B illustrate examples of a status site.
Figure 9B:
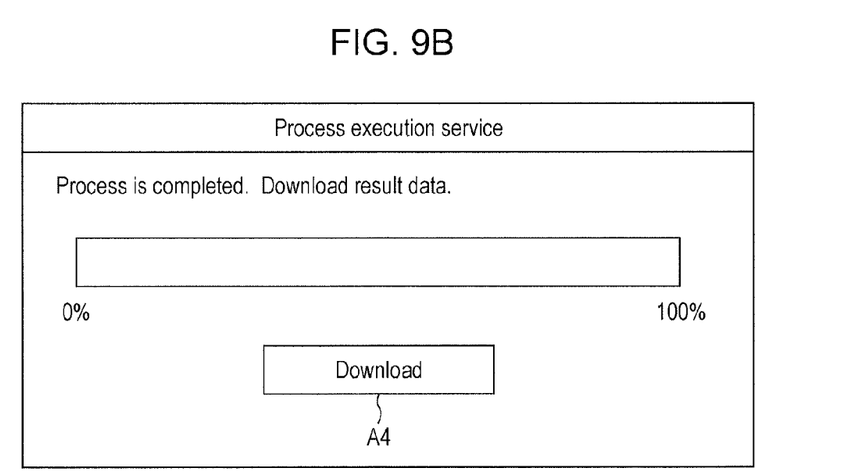

FIGS. 9A and 9B illustrate examples of the status site. FIG. 9A illustrates the status site indicating a state in which the requested processing is not completed. In FIG. 9A, the degree of progress (60% of the entire service in this example) is represented with a progress bar C1. FIG. 9B illustrates the status site indicating a state in which the requested processing is completed and the result data is ready to be downloaded. An operation image A4 representing a character string "Download" is displayed on the status site. Upon tapping of the operation image A4 by the user with the UI section 24 in the output apparatus 20, the output apparatus 20 acquires the result data from the service server apparatus 30. The output apparatus 20 outputs the acquired result data on a medium on the basis of the operation by the user. The output apparatus 20 outputs the result data to supply the result of the requested processing to the user. The output destination of the result data is not limited to the medium and may be a display unit, such as a display, or a terminal, such as a smartphone, carried by the user.

[1-3-3-3] Instruction for Notification of Status

After the external apparatus has called the information processing apparatus 10, the instruction unit 103 instructs the external apparatus (the output apparatus 20 in the present exemplary embodiment) to perform the notification of the status concerning the requested processing. Such an instruction for the notification is hereinafter referred to as a "notification instruction." The status in which the notification is requested with the notification instruction is, for example, the status indicating whether the requested processing by the service server apparatus 30 is completed, the degree of progress of the requested processing, the status indicating whether the output apparatus 20 acquires the result data, or the status indicating whether the output apparatus 20 outputs the result data.

The output apparatus 20 uses the data that has been stored before the result data is output in the above manner as status data representing the status in which the notification is requested. For example, the output apparatus 20 stores the numerical value (60% in FIG. 9A and 100% in FIG. 9B) of a percentage displayed as the degree of progress represented by the progress bar C1 when the status site illustrated in FIG. 9A or 9B is displayed and uses the numerical value as the status data indicating the degree of progress or whether the result data are acquired. In addition, the output apparatus 20 stores a history of the reception of the result data and a history of the output of the result data and uses the histories as the status data indicating the status in which the result data is acquired and the status data indicating the status in which the result data is output, respectively. The instruction unit 103 instructs the output apparatus 20 to transmit the status data to the information processing apparatus 10 using, for example, Simple Network Management Protocol (SNMP).

The instruction unit 103 repeats the notification instruction and terminates the notification instruction if the external apparatus indicates the status in which the result data indicating the result of the requested processing is acquired or output. The instruction unit 103 stores a time when the output apparatus 20 has called the information processing apparatus 10 using the destination information and executes the notification process each time a predetermined time (for example, 30 minutes or one hour) elapsed since the time. The instruction unit 103 terminates the notification process when the status data transmitted from the output apparatus 20 is the history of the reception of the result data or the history of the output of the result data, that is, when the output apparatus 20 indicates the status in which the result data is acquired or output.

[1-3-4] Recording Unit 104

The recording unit 104 is an exemplary unit to record the status of the requested processing. As described above, the request data is supplied to the recording unit 104 from the transmission unit 101 (the input information is also supplied to the recording unit 104 if the input information is input). In this case, the recording unit 104 records the request for the specified process in association with the process identification information indicated by the request data. When the input information is input, the recording unit 104 records the acceptance of the input information in association with the process identification information. The destination information is supplied to the recording unit 104 from the notification unit 102. In this case, the recording unit 104 records the notification of the destination information in association with the process identification information included in the destination information.

The destination information included in the HTTP request transmitted from the output apparatus 20 is supplied to the recording unit 104 from the instruction unit 103. This destination information is the one used when the external apparatus (the output apparatus 20 in the present exemplary embodiment) has called the information processing apparatus 10. The recording unit 104 records the fact that the output apparatus 20 has called the information processing apparatus 10 in association with the process identification information included in the supplied destination information. As described above, when the external apparatus (the output apparatus 20) has called the information processing apparatus 10 using the destination information, the recording unit 104 records the status of the requested processing (the status in which the output apparatus 20 has called the information processing apparatus 10 in this example) on the basis of the associated information (the process identification information in this case) included in the destination information.

The status data transmitted from the output apparatus 20 in response to the notification instruction by the instruction unit 103 is supplied to the recording unit 104. The recording unit 104 records the status indicated by the status data in association with the process identification information included in the destination information used in the calling in response to which the notification instruction is issued.

The recording unit 104 also records time information indicating the current time in the recording of the status of the requested processing in the above manner. The recording unit 104 may also record information (for example, the user ID) about the user who has performed the operation to request the specified process and the user who receives the result of the requested processing. The above method allows a more detailed status of the requested processing to be recorded.

[1-4] Operations

The information processing system 1 executes the management process described above (the process to manage the status of the process which the service server apparatus 30 is requested to perform) on the basis of the above configurations.

Figure 10:
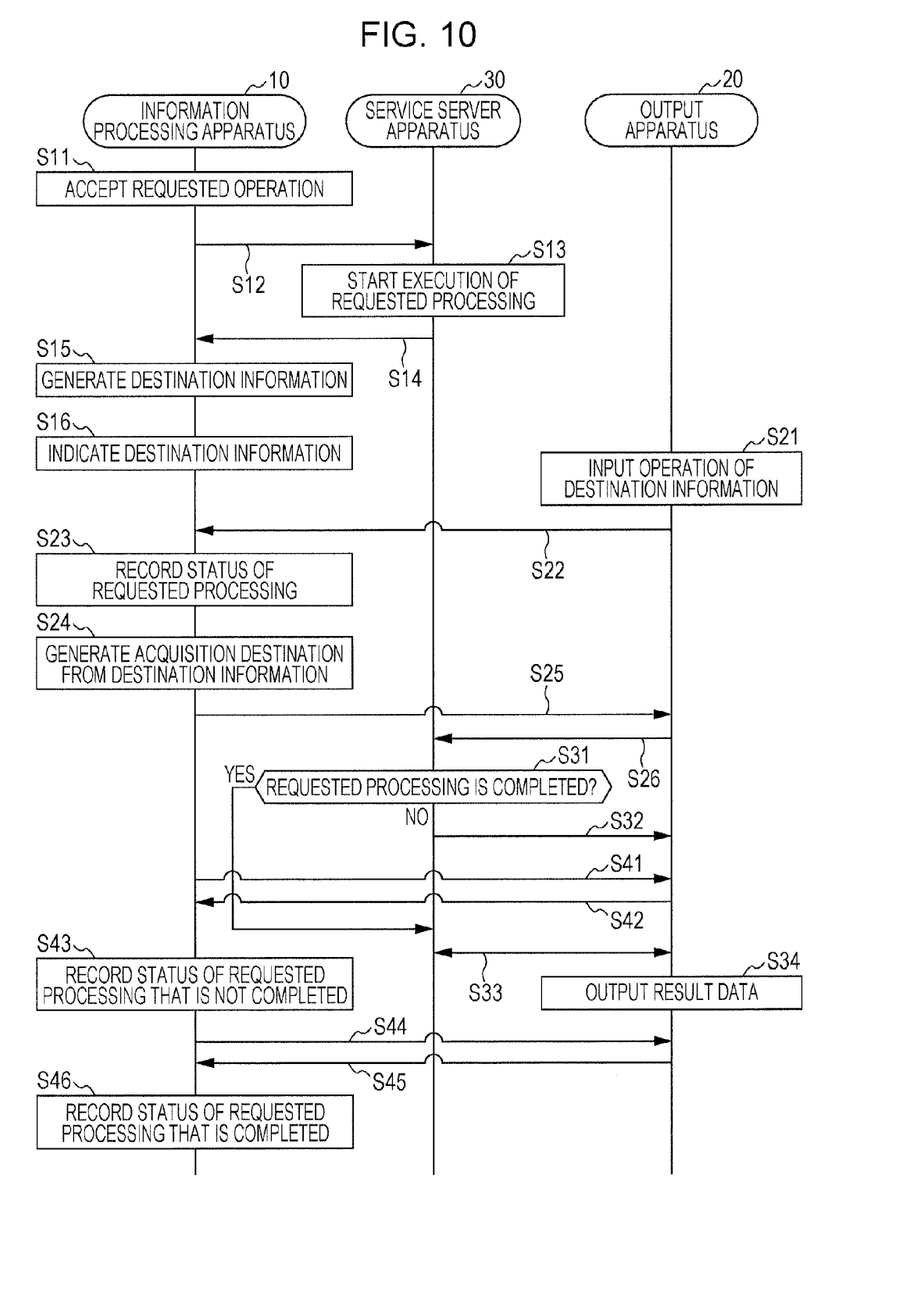
FIG. 10 is a sequence diagram illustrating an exemplary operation of each apparatus in a management process.

FIG. 10 is a sequence diagram illustrating an example of the operation of each apparatus in the management process. The management process is started in response to an operation to request the information processing apparatus 10 to execute a process by the user (such an operation is referred to as a "requested operation"). The requested operation is the operation on the menu site illustrated in FIG. 5 or the operation to input the input information described above.

Referring to FIG. 10, in Step S11, the information processing apparatus 10 accepts the requested operation. In Step S12, the information processing apparatus 10 transmits the request data corresponding to the accepted requested operation to the request destination of the service server apparatus 30, which is determined for each process execution service. Steps S11 and S12 are performed by the transmission unit 101. In Step S13, the service server apparatus 30 starts the execution of the requested processing indicated by the received request data. In Step S14, the service server apparatus 30 transmits the acquisition destination to the information processing apparatus 10. In Step S15, the information processing apparatus 10 uses the received acquisition destination to generate the destination information. In Step S16, the information processing apparatus 10 notifies the user of the generated destination information. Steps S15 and S16 are performed by the notification unit 102.

In response to the input operation to input the destination information notified in Step S16 in the output apparatus 20 by the user, in Step S21, the output apparatus 20 accepts the input operation. In Step S22, the output apparatus 20 uses the input destination information to call the information processing apparatus 10. In Step S23, the information processing apparatus 10 records the status of the requested processing on the basis of the destination information which the output apparatus 20 uses for the calling. Step S23 is performed by the recording unit 104. In Step S24, the information processing apparatus 10 generates the acquisition destination from the destination information. In Step S25, the information processing apparatus 10 transmits the HTTP response to instruct access to the generated acquisition destination to the output apparatus 20. Steps S24 and S25 are performed by the instruction unit 103. In Step S26, the output apparatus 20 uses the acquisition destination included in the header of the received HTTP response to access the service server apparatus 30.

Upon access to the acquisition destination, in Step S31, the service server apparatus 30 determines whether the requested processing is completed. If the service server apparatus 30 determines that the requested processing is not completed (NO in Step S31), in Step S32, the service server apparatus 30 transmits the HTTP response representing the status site illustrated in FIG. 9A to the output apparatus 20. If the service server apparatus 30 determines that the requested processing is completed (YES in Step S31), in Step S33, the service server apparatus 30 transmits the HTTP response representing the status site illustrated in FIG. 9B to the output apparatus 20 and, in response to an operation to tap the operation image A4 by the user, transmits the result data to the output apparatus 20. In Step S34, the output apparatus 20 outputs the received result data on a medium or the like on the basis of an operation by the user.

In the example in FIG. 10, in Step S41, the information processing apparatus 10 issues the notification instruction to the output apparatus 20 after Step S32 and before Step S33. Upon reception of the notification instruction, in Step S42, the output apparatus 20 transmits the status data to the information processing apparatus 10. In Step S43, the information processing apparatus 10 records the status indicated by the received status data, that is, the status indicating that the requested processing is not completed. In Step S44, the information processing apparatus 10 issues the notification instruction to the output apparatus 20 after Step S34. In Step S45, the output apparatus 20 transmits the status data to the information processing apparatus 10. In Step S46, the information processing apparatus 10 records the status indicated by the received status data, that is, the status indicating that the requested processing is completed. Steps S41 to S46 are performed by the recording unit 104.

In the exemplary embodiments, the information processing apparatus 10 notifies the external apparatus (the output apparatus 20) of the destination information including the acquisition destination as the associated information to instruct the external apparatus, which has called the information processing apparatus 10 using the destination information, to access the acquisition destination. In the exemplary embodiments, the process identification information (the information for identifying the requested processing) is included in the associated information. The information processing apparatus 10 uses the information acquired in the above manner, for example, for the determination of a condition to start another process, for parameters in the other process, or as information to be indicated to the user.

In the exemplary embodiments, when the information processing apparatus 10 has been called by the external apparatus using the destination information, the status of the requested processing is recorded on the basis of the associated information included in the destination information.

Since the external apparatus is instructed to perform the notification of the status of the process in the exemplary embodiments, it is possible to acquire the status of the requested processing until the result data is output from the service server apparatus 30. In the exemplary embodiments, the notification instruction is terminated upon acquisition or output of the result data.

In the exemplary embodiments, even if the information processing apparatus 10 does not store the destination information, the operation concerning the requested processing is instructed on the basis of the destination information used when the information processing apparatus 10 has been called by the external apparatus. Since the information processing apparatus 10 does not perform the operation concerning the requested processing, for example, the processing in the CPU for the operation does not occur and, even if it is necessary to store any data (for example, the result data) due to the operation, the data is only stored in the external apparatus and is not stored in the information processing apparatus 10.

[2] Modifications

The exemplary embodiments described above are only examples of the present invention and may be modified in the following manner. Modifications described below may be combined if desired.

[2-1] Calling Condition

Although no restriction is imposed on the calling by the external apparatus using the destination information in the exemplary embodiments, any restriction may be imposed on the calling by the external apparatus using the destination information. For example, the notification unit 102 notifies the user of the destination information including a condition to determine a time when the information processing apparatus 10 is ready to be called (such a condition is hereinafter referred to as a "time condition") as the associated information. The time condition indicates, for example, a time elapsed since the request data has been transmitted (hereinafter referred to as a "first elapsed time") and a time elapsed since the instruction unit 103 has issued the instruction to the external apparatus (hereinafter referred to as a "second elapsed time").

Figure 11:
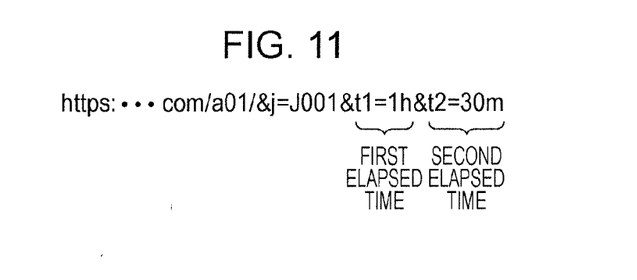
FIG. 11 illustrates an example of the destination information in a modification.

FIG. 11 illustrates an example of the destination information in a modification. In this example, "t1=1h", which is the first elapsed time, and "t2=30m", which is the second elapsed time, are added to the end of the process identification information in the destination information illustrated in FIG. 7. In the example in FIG. 11, "t1=1h" indicates that the first elapsed time is one hour and "t2=30m" indicates that the second elapsed time is 30 minutes.

The instruction unit 103 issues the instruction described above (the instruction for the access operation or the notification instruction) to the external apparatus if the time condition included in the destination information used when the external apparatus has called the information processing apparatus 10 is met.

In the example in FIG. 11, the instruction unit 103 does not issue the instruction even if the output apparatus 20 calls the information processing apparatus 10 using the destination information until one hour elapsed since the request data has been transmitted by the transmission unit 101. It takes a certain time to execute the requested processing and give the result of the requested processing even when the request data has been transmitted to the service server apparatus 30. When the certain time is estimated from the past record or the amount of data to be processed, it is desirable to set the estimated time as the first elapsed time. In addition, the instruction unit 103 does not issue the instruction even if the output apparatus 20 calls the information processing apparatus 10 using the destination information until 30 minutes elapsed since the instruction unit 103 has transmitted the HTTP response B2 illustrated in FIG. 8 to the output apparatus 20 to instruct the access operation. Since the HTTP response is not transmitted until the time condition is met in the present modification, as described above, the amount of data exchanged between the information processing apparatus 10 and the external apparatus is reduced, compared with a case in which the instruction is issued regardless of the time condition.

The notification unit 102 may indicate the destination information in which the length of the elapsed time is varied each time the calling using the destination information is performed. For example, the destination information in which the second elapsed time, which is originally set to 30 minutes, is varied to "t2=20" is subsequently indicated and the destination information in which the second elapsed time is varied to "t2=10" is subsequently indicated. The time condition in which a time zone during which the information processing apparatus 10 is ready to be called is represented by times of day may be used, instead of the elapsed time. For example, when "t3=0900-1800", the instruction unit 103 issues the instruction if a time zone t3 from 9:00 to 18:00 is met.

[2-2] Multiple Pieces of Destination Information

The notification unit 102 may notify the user of multiple pieces of destination information. In this case, for example, the time condition described above is used in the following manner. Specifically, when the notification unit 102 notifies the user of multiple pieces of destination information, the notification unit 102 uses a condition to determine the order of the calling of the information processing apparatus 10 using the respective pieces of destination information as the time condition. A specific example in which such notification is performed will now be described with reference to FIG. 12.

Figure 12:
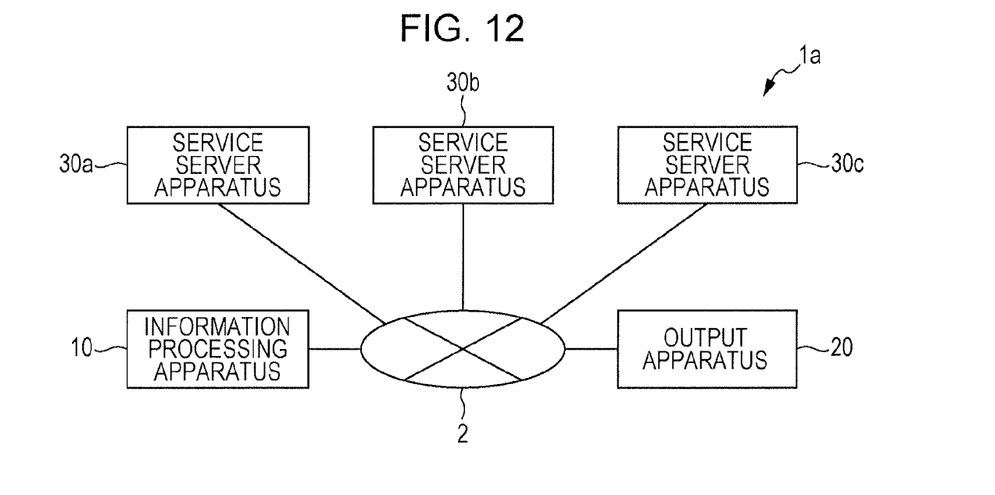
FIG. 12 illustrates an example of the entire configuration of an information processing system in a modification.

FIG. 12 illustrates an example of the entire configuration of an information processing system in a modification. In the example in FIG. 12, an information processing system 1a includes service server apparatuses 30a, 30b, and 30c. It is assumed that the user requests a process to process, for example, a certain piece of data in the service server apparatuses 30a, 30b, and 30c in this order. The request data indicating this request is simultaneously transmitted to the request destinations of the respective process execution services and the respective process execution services transmit predetermined acquisition destinations (acquisition destinations a, b, and c) to the information processing apparatus 10. The notification unit 102 uses the respective acquisition destinations that are transmitted to generate multiple pieces of destination information including the acquisition destinations as the associated information.

Figure 13:
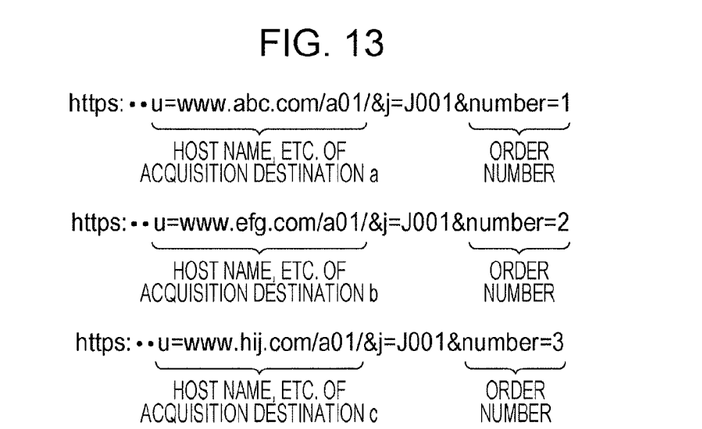
FIG. 13 illustrates an example of multiple pieces of destination information that are generated.

FIG. 13 illustrates an example of the multiple pieces of destination information that are generated. In the example in FIG. 13, destination information a "https:••u=www.abc.com/a01/&j=J001&number=1", destination information b "https:••u=www.efg.com/a01/&j=J001&number=2", and destination information c "https:••u=www.hij.com/a01/&j=J001&number=3" are generated. A host name, etc. of each acquisition destination is indicated in each piece of destination information and all of the destination information a, the destination information b, and the destination information c include the process identification information "j=J001." Order numbers "number=1", "number=2", and "number=3" are included as the associated information after the respective pieces of process identification information.

The order numbers represent the order in which the instruction is issued on the basis of the associated information included in the destination information when the information processing apparatus 10 is called from the external apparatus using the destination information including the order number. In the example in FIG. 13, the acquisition destination a is first used, the acquisition destination b is secondly used, and the acquisition destination c is thirdly used. If the output apparatus 20 first calls the information processing apparatus 10 using the destination information a, the instruction unit 103 determines that the time condition is met to issue the instruction because of the correct order. If the output apparatus 20 next calls the information processing apparatus 10 using the destination information c, the instruction unit 103 determines that the time condition is not met not to issue the instruction because of the incorrect order. Accordingly, the instruction for the operation concerning the process is not issued if the destination information is not used in the order that is determined in the notification. In other words, when the multiple pieces of destination information are indicated, the operations concerning the process are managed so as to be performed in the predetermined order.

Although the order numbers are determined on the basis of the order of the execution of the requested processing in the above example, the determination of the order numbers is not limited to this. For example, when the requested processing is concurrently executed for the pieces of destination information, the order numbers may be determined in ascending order of the times required to execute the process.

After the instruction unit 103 instructs the operation concerning the process, the instruction unit 103 may issue the notification instruction for the destination information of the next order number. If the status in which the requested processing is completed is indicated in response to the notification instruction, the instruction unit 103 accepts the calling using the destination information including the next order number to issue the instruction.

[2-3] Notification of Specific Information

In the above modification, if the time condition is not met, the notification unit 102 may notify the user of information for identifying the destination information to be used next, that is, the destination information for which the time condition is met (such information is hereinafter referred to as "specific information" for the destination information). For example, if the calling using the destination information c is performed next to the calling using the destination information a in the example in FIG. 13, the notification unit 102 notifies the user of "https:••?p=xxx&u=xxx&j=J001&number=2" as the specific information for the destination information b. Since the information processing apparatus 10 does not store the destination information of which the user is notified, the scheme name and the host name, etc. of the destination information b is unknown. In the specific information, "p=xxx" and "u=xxx" indicate that the corresponding pieces of information are unknown.

In contrast, as for the destination information b, it is estimated that the apparatus destination and the process identification information ("j=J001" in this example) are common to those in the destination information c and that the order number is "number=2" next to that of the acquisition destination a ("number=1" in this example). Accordingly, the notification unit 102 generates the destination information including the estimated associated information as the specific information to notify the user of the specific information. The user identifies the destination information b having the same order number, among the destination information a, the destination information b, and the destination information c, with the specific information of which the user is notified to cause the output apparatus 20 to call the information processing apparatus 10 using the identified destination information b.

[2-4] Automatic Calling by External Apparatus

Although the output apparatus 20 requires the operation by the user in the calling using the destination information in the above exemplary embodiments, the calling using the destination information may be automatically executed without the operation by the user.

Figure 14:
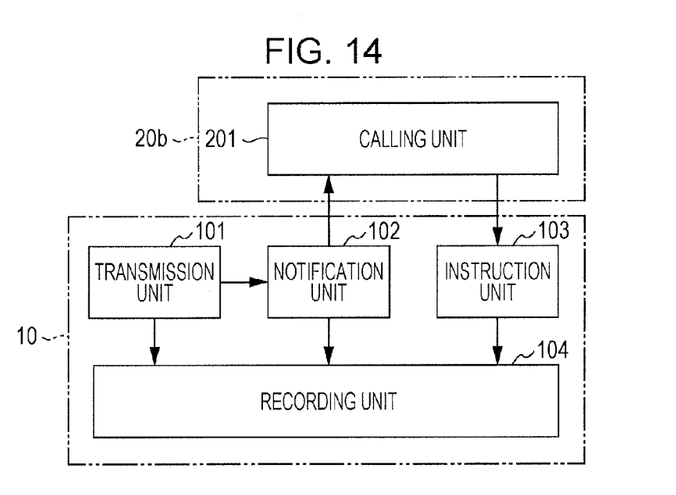
FIG. 14 is a block diagram illustrating an example of the functional configuration of each apparatus in a modification.

FIG. 14 is a block diagram illustrating an example of the functional configuration of each apparatus in a modification. An output apparatus 20b including a calling unit 201 is illustrated in the example in FIG. 14, in addition to the information processing apparatus 10 illustrated in FIG. 4. The calling unit 201 is a unit realized by cooperation of, for example, the control section 21, the storage section 22, and the communication section 23. The destination information transmitted from the notification unit 102 is supplied to the calling unit 201. The calling unit 201 stores timing data in which the timing when the information processing apparatus 10 is called using the destination information that is supplied is defined. The timing data is defined so that, for example, the calling is executed after one hour elapsed since the destination information was supplied and the calling is subsequently executed for every 30 minutes.

The calling unit 201 calls the information processing apparatus 10 using the destination information at the timing defined in the timing data (specifically, the calling unit 201 generates the HTTP request illustrated in FIG. 8 to transmit the generated HTTP request). The HTTP request transmitted by the calling unit 201 is supplied to the instruction unit 103, which issues the instruction based on the destination information. According to this modification, the trouble to the user is reduced, compared with a case in which the calling with the calling unit 201 is not executed.

[2-5] Authority of External Apparatus

The instruction unit 103 may determine whether the instruction is issued on the basis of the degree of confidentiality of the requested processing. For example, when the external apparatus does not have the authority concerning the requested processing, the instruction unit 103 does not instruct the operation concerning the requested processing. The authorities concerning the requested processing include, for example, the authority to acquire the status of the requested processing, the authority to acquire the result data of the requested processing, and the authority to output the result data of the requested processing. In other words, the authority indicates whether the operation which the output apparatus 20 is capable of performing for the requested processing may be practically performed. The instruction unit 103 stores an authority table in which the authorities are associated with the user IDs of the users having the respective authorities.

Figure 15:
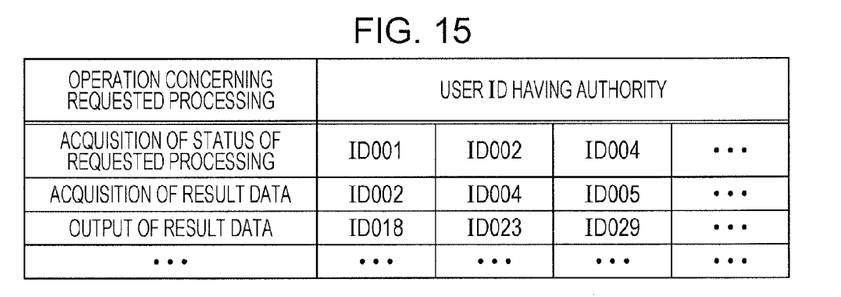
FIG. 15 illustrates an exemplary authority table.

FIG. 15 illustrates an example of the authority table. In the example in FIG. 15, the operations concerning the requested processing: the "acquisition of the status of the requested processing", the "acquisition of the result data", and the "output of the result data" are associated with the user IDs of the users having the authorities to perform the respective operations. The user operating the output apparatus 20 inputs the user ID and the password to log in the service server apparatus 30. When the service server apparatus 30 is logged in by the user ID having the authority, the output apparatus 20 is in a state in which the output apparatus 20 has the authority. In contrast, when the service server apparatus 30 is logged in by the user ID which does not have the authority, the output apparatus 20 is in a state in which the output apparatus 20 does not have the authority.

Upon calling of the information processing apparatus 10 by the output apparatus 20 using the destination information, the instruction unit 103 returns, for example, an HTTP 401 response code and causes the output apparatus 20 to transmit authentication information to acquire the authentication information that is transmitted. The output apparatus 20 may include the calling unit 201 described above in the above modification and the calling unit 201 may call the information processing apparatus 10 using the destination information resulting from addition of the user ID to the destination information as the associated information (for example, the destination information to which the associated information "UserID=ID001" is added). In this case, the instruction unit 103 acquires the user ID included in the destination information used in the calling. The instruction unit 103 determines whether the user ID that is acquired in the above manner is associated with the operation to be instructed in the authority table. The instruction unit 103 instructs the output apparatus 20 to perform the operation if the user ID is associated with the operation to be instructed in the authority table and does not instruct the output apparatus 20 to perform the operation if the user ID is not associated with the operation to be instructed in the authority table.

Although each operation is associated with the user IDs in the example in FIG. 15, each operation may be associated with an apparatus ID for identifying the external apparatus, such as the output apparatus 20, instead of the user IDs. Also in this case, the instruction unit 103 acquires the apparatus ID in the same manner as in the user IDs and determines whether the operation is instructed using the authority table. If the external apparatus in the state in which the external apparatus does not have the authority performs the operation concerning the requested processing, the user who should not know the content of the requested processing may possibly know the content of the requested processing. In the present modification, the instruction unit 103 determines whether the instruction is issued on the basis of the state of the authority in the above manner to make such an operation difficult to be performed. Accordingly, the degree of confidentiality of the requested processing is improved, compared with a case in which the instruction is issued to the external apparatus in the state in which the external apparatus does not have the authority.

[2-6] Transfer Request

The user who has requested the service server apparatus 30 to execute the specified process (hereinafter referred to as a "request user") is charged for the price of the specified process. Although the user who has requested the service server apparatus 30 to execute the specified process may be different from the user who receives the result of the requested processing (hereinafter referred to as a "receiving user"), the request user is charged for the price even in this case. Specifically, the user identified by the user ID that has logged in the transmission of the request data for the specified process is considered as the request user to be charged for the price. In such a case, a process to cause the receiving user to pay part or all of the charged price (a billing amount) to the request user, that is, a process to transfer the price to the receiving user (hereinafter referred to as a "transfer process") may be executed.

Figure 16:
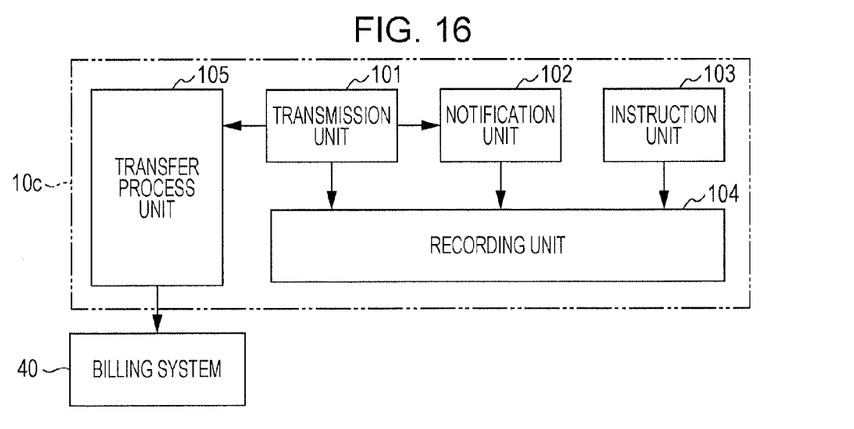
FIG. 16 is a block diagram illustrating an example of the functional configuration of each apparatus in a modification.

FIG. 16 is a block diagram illustrating an example of the functional configuration of each apparatus in a modification. An information processing apparatus 10c including a transfer process unit 105, in addition to the units illustrated in FIG. 4, is illustrated in the example in FIG. 16. The transfer process unit 105 is an exemplary unit to execute the transfer process described above. The transfer process unit 105 acquires the user ID of the user operating the output apparatus 20 (that is, the receiving user) in the manner performed by the instruction unit 103 in the above modification. The transfer process unit 105 stores, for example, the percentage of payment sharing between the request user and the receiving user (for example, 50% for the request user and 50% for the receiving user) in advance. The transfer process unit 105 acquires the billing amount from the service server apparatus 30 or a billing system 40 that charges the price. When the price is determined depending on the content of the requested processing, the transfer process unit 105 may calculate the billing amount from the content of the specified process that is requested and that is indicated by the request data, which is supplied from the transmission unit 101.

The status of the requested processing that is recorded is supplied to the transfer process unit 105 from the recording unit 104. For example, if the status in which the receiving user has output the result data is supplied, the transfer process unit 105 acquires or calculates the billing amount in the above manner to transmit billing amount data indicating the billing amount to the billing system 40. Upon reception of the billing mount data, the billing system 40, which charges the price to the user, for example, sends a bill with which the billing amount indicated by the billing amount data is charged to the address of the registered user. Alternatively, the billing system 40 withdraws the billing amount from an account of a bank of the registered user or charges the billing amount to an account of a credit card of the registered user. The transfer process unit 105 executes the transfer process in the above manner. Accordingly, even if the process execution service does not support the charge to multiple users, the receiving user is also charged for the price of the requested processing.

[2-7] Deletion of Result Data

The process execution service may be provided using a charging method depending on the amount of computer resources (for example, a CPU and a storage area) of the service server apparatus 30 used in the process execution service. The service server apparatus 30 may continue to use the computer resource, which is the storage area, to store the result data even after the requested processing is completed. This causes the unnecessary result data to be accumulated to strain the computer resources and/or to charge the price for the unnecessary computer resources. In such a case, deletion of the result data may be requested after the requested processing is completed. Specifically, the status of the requested processing recorded by the recording unit 104 is supplied to the transmission unit 101 and, for example, when the status in which the receiving user has output the result data is supplied, the transmission unit 101 transmits the request data indicating that the deletion of the result data is requested to the request destination (the destination at which the request for the process is accepted). This allows the amount of the computer resources that are used to be reduced, compared with a case in which the deletion of the result data is not requested.

The request for the deletion of the result data may not be accepted unless the request is from the information processing apparatus that has transmitted the request data depending on the mode of the process execution service provided by the service server apparatus. According to the present modification, since the request data for the deletion is transmitted from the transmission unit 101 in the information processing apparatus even in such a case, the result data is deleted to reduce the amount of the computer resources that are used.

[2-8] Transfer Method

Although the instruction unit 103 uses the HTTP response of the HTTP status code 302 to instruct transfer of the access destination of the output apparatus 20 (the calling destination from the viewpoint of the information processing apparatus 10) from the information processing apparatus 10 to the acquisition destination (the redirect) in the above exemplary embodiments, this instruction may be issued using another method. For example, the instruction unit 103 may use HTTP status code 301 (Moved Permanently), HTTP status code 303 (See Other), or HTTP status code 307 (Temporary Redirect) other than the HTTP status code 302 for transferring the access destination or may issue the transfer instruction using Common Gateway Interface (CGI) or JavaScript. Any method may be used as long as the output apparatus 20 is caused to access the acquisition destination on the basis of the associated information included in the destination information used in the calling of the information processing apparatus 10.

[2-9] how to Separate Pieces of Associated Information

Although "?" and "&" are used as the symbols used to separate the pieces of information in the destination information in the above exemplary embodiments, "?" and "&" are not limitedly used. For example, "!", "#", and "%" may be used. Any symbol and character may be used as long as the symbol and the character are determined to separate the pieces of information included in the destination information in the information processing system. However, it is desirable to use a character and a symbol that are rarely used to represent information including destinations and IDs in order to easily distinguish the symbol and character from the pieces of information.

[2-10] Operation Instruction

Although the instruction unit 103 exchanges data using the redirect or the SNMP to instruct the output apparatus 20 to perform the operation concerning the requested processing in the above exemplary embodiments, the exchange of data is not limitedly performed using the above method. For example, the instruction unit 103 may generate data in which the content of the instruction is described according to a specific rule (such data is hereinafter referred to as "instruction data") and may transmit the instruction data to the output apparatus 20 to instruct the operation. When the output apparatus 20 has a function to operate according to this rule, the output apparatus 20 performs the operation indicated by the instruction data that is received, that is, the operation concerning the requested processing.

Inversely, the output apparatus 20 may instruct the information processing apparatus to perform the operation. For example, a command to instruct the operation of the information processing apparatus 10 is included in the associated information to instruct the operation (of the information processing apparatus 10) when the output apparatus 20 has called the information processing apparatus 10.

[2-11] Encryption of Associated Information

The associated information may be encrypted and the encrypted associated information may be represented by a character string. In this case, the information processing apparatus 10 has a symmetric key and decodes the encrypted portion, that is, the associated information with the symmetric key. The output apparatus 20 is caused not to have the symmetric key. In the information processing system, the apparatus which the user operates to acquire the result of the requested processing may be the output apparatus 20 or another external apparatus. The external apparatus may have a degree of confidentiality lower than that of the information processing apparatus 10. However, since only the information processing apparatus 10 has the symmetric key in the present modification, the degree of confidentiality is improved, compared with a case in which the other external apparatus also has the symmetric key.

[2-12] Upper Limit of Number of Times of Calling

An upper limit of the number of times of calling may be determined as the calling condition described above. For example, when the information processing apparatus is called by multiple output apparatuses operated by different users, the information processing apparatus accepts the calling a predetermined number of times to instruct the operation concerning the requested processing. The information processing apparatus does not accept the calling after the calling has been accepted the predetermined number of times and does not issue the instruction. Specifically, the notification unit 102 indicates the destination information including the process identification information and the upper limit of the number of times of calling as the associated information. The instruction unit 103 counts the number of the pieces of process identification information recorded by the recording unit 104 as the number of times of calling and, if the count is not higher than a threshold value (the upper limit of the number of times of calling), accepts the calling to issue the instruction. In other words, the instruction unit 103 issues the instruction if the number of times when the information processing apparatus 10 is called using the destination information is not higher than the threshold value. Accordingly, the number of times when the operation concerning the requested processing is instructed is limited to, for example, limit the number of users who acquire the result data.

[2-13] Associated Information

The associated information is not limited to the ones described in the above exemplary embodiments and modifications. For example, the user ID and the password used by the user to log in the service server apparatus 30 may be used as the associated information. An electronic mail address or an SNS account, which is used as the destination of any notification to the user, may be used as the associated information. When such personal information is used as the associated information, it is desirable to encrypt the information in the manner described above.

[2-14] Reading Out of Associated Information by External Apparatus

Although only the information processing apparatus 10 is capable of reading out the associated information in the above exemplary embodiments and modifications, the associated information may be read out by the output apparatus 20. In this case, the degree of confidentiality of the output apparatus 20 is desirably higher than the degree of confidentiality that is required for the requested processing, as described above. When the degree of confidentiality is varied between the pieces of associated information, the pieces of associated information having higher degrees of confidentiality may be encrypted to allow only the other pieces of associated information to be read out by the output apparatus 20.

For example, it is assumed that multiple pieces of destination information are indicated to the output apparatus 20 and each piece of destination information includes the associated information, which is used as the parameter of the operation performed by the output apparatus 20 in response to the instruction. In this case, the output apparatus 20 uses a certain piece of destination information to call the information processing apparatus 10 and the instruction unit 103 instructs the operation concerning the requested processing. When the parameter included in the destination information that is not used in the calling is desirably used in this operation, the output apparatus 20 reads out the parameter to cause the operation to be performed by the output apparatus 20.

[2-15] Categories of Present Invention

The present invention may be embodied by an information processing method for realizing the process executed by the information processing apparatus or the like, in addition to the information processing apparatus and the information processing system including the information processing apparatus. The process here is, for example, the management process described above with reference to in FIG. 10. The present invention may be embodied by a program causing a computer, such as the information processing apparatus, to function as the units illustrated in FIG. 4 and so on. The program may be provided on a recording medium, such as an optical disk, on which the program is stored or may be downloaded to the computer via a network, such as the Internet, to be installed for use.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising at least one central processing unit (CPU) and memory storing instructions that, when executed by the at least one CPU, configure the information processing apparatus to:
    transmit a request for processing to a process execution service server;
    notify a user of the information processing apparatus of destination information including first information used to call the information processing apparatus and second information comprising an acquisition destination from which a result of the requested processing performed by the process execution service server is acquired; and
    in response to a call received from an output apparatus using the destination information that was notified to the user, instruct the output apparatus to directly access the acquisition destination included in the second information to retrieve a status of the requested processing.

2. The information processing apparatus according to claim 1,
    wherein the second information includes process identification information for identifying the requested processing.

3. The information processing apparatus according to claim 1, wherein the at least one CPU, in response to a call received from the output apparatus using the destination information that was notified to the user, records the status of the requested processing.

4. The information processing apparatus according to claim 2, wherein the at least one CPU, in response to a call received from the output apparatus using the destination information that was notified to the user, records the status of the requested processing based on the process identification information included in the second information.

5. The information processing apparatus according to claim 1,
    wherein the second information includes a time condition to determine a time when the information processing apparatus is available, and
    wherein the at least one CPU only instructs the output apparatus if the call received from the output apparatus occurs when the information processing apparatus is available, based on the time condition.

6. The information processing apparatus according to claim 5,
    wherein the destination information comprises a plurality of pieces of destination information, and
    the at least one CPU determines an order of the call using the time conditions in the respective pieces of destination information.

7. The information processing apparatus according to claim 1,
    wherein the at least one CPU instructs the output apparatus only if a number of times the call has been received from the output apparatus is less than or equal to a threshold value.

8. The information processing apparatus according to claim 1,
    wherein the at least one CPU instructs the output apparatus to indicate a status of the requested processing after the call is received from the output apparatus.

9. The information processing apparatus according to claim 8,
    wherein at least one CPU repeatedly instructs the output apparatus to indicate a status of the requested processing if the output apparatus indicates a status in which the result of the requested processing is acquired, and terminates instructing the output apparatus when the output apparatus indicates a status in which the result of the requested processing is output.

10. The information processing apparatus according to claim 1,
    wherein the at least one CPU instructs the output apparatus only if the output apparatus has an authority concerning the requested processing.

11. A non-transitory computer readable medium storing a program causing a computer to execute a process comprising:
    transmitting a request for processing to a process execution service server;
    notifying a user of destination information including first information used to call the computer and second information comprising an acquisition destination from which a result of the requested processing performed by the process execution service server is acquired; and
    in response to a call received from an output apparatus using the destination information that was notified to a user, instruct the output apparatus to directly access the acquisition destination included in the second information to retrieve a status of the requested processing.

12. An information processing method in an information processing apparatus, the method comprising:
    transmitting a request for processing to a process execution service server;
    notifying a user of the information processing apparatus of destination information including first information used to call the information processing apparatus and second information comprising an acquisition destination from which a result of the requested processing performed by the process execution service server is acquired; and
    in response to a call received from an output apparatus using the destination information that was notified to the user, instruct the output apparatus to directly access the acquisition destination included in the second information to retrieve a status of the requested processing.

13. The information processing apparatus according to claim 1, wherein the first information and the second information are uniform resource locators (URLs).

14. The information processing apparatus according to claim 1, wherein the first information is a uniform resource locator (URL) of the information processing apparatus, and
    wherein the acquisition destination is a URL indicating a location at which a result of the requested processing will be stored by the process execution service server.

15. The information processing apparatus according to claim 14, wherein the output apparatus is instructed to directly access the URL indicating the location at which the result of the requested processing will be stored to retrieve the status of the requested processing.

* * * * *